United States Patent
Lewis et al.

(10) Patent No.: US 11,207,896 B2
(45) Date of Patent: Dec. 28, 2021

(54) HIGH ACCURACY PRINTING ON A CURVED SURFACE USING FIDUCIAL MARKERS AND A CAMERA

(71) Applicant: Xyrec IP B.V., Schiphol-Rijk (NL)

(72) Inventors: Christopher L. Lewis, Helotes, TX (US); Matthew M. Robinson, San Antonio, TX (US); Paul T. Evans, San Antonio, TX (US); Peter Boeijink, Schiphol-Rijk (NL); Branson P. Brockschmidt, San Antonio, TX (US)

(73) Assignee: Xyrec IP B.V., Schiphol-Rijk (NL)

( * ) Notice: Subject to any disclaimer, the term of this patent is extended or adjusted under 35 U.S.C. 154(b) by 0 days.

(21) Appl. No.: 16/282,358

(22) Filed: Feb. 22, 2019

(65) Prior Publication Data

US 2020/0269602 A1 Aug. 27, 2020

(51) Int. Cl.
*B41J 3/407* (2006.01)
*B25J 5/00* (2006.01)
*B25J 9/16* (2006.01)

(52) U.S. Cl.
CPC ............ *B41J 3/4073* (2013.01); *B25J 5/007* (2013.01); *B25J 9/1679* (2013.01); *B25J 9/1697* (2013.01)

(58) Field of Classification Search
CPC .................................................. B41J 3/4073
See application file for complete search history.

(56) References Cited

U.S. PATENT DOCUMENTS

| | | | |
|---|---|---|---|
| 4,664,873 A * | 5/1987 | Hendrich | B25J 5/04 376/260 |
| 5,318,254 A | 6/1994 | Shaw et al. | |
| 5,563,591 A | 10/1996 | Jacobs et al. | |
| 9,527,275 B1 * | 12/2016 | Flannigan | B41J 11/46 |
| 2005/0115421 A1 * | 6/2005 | Lyons | B41J 3/4073 101/42 |
| 2006/0068109 A1 | 3/2006 | Frankenberger et al. | |
| 2007/0062383 A1 * | 3/2007 | Gazeau | B41J 3/4073 101/35 |
| 2009/0167817 A1 | 7/2009 | Orr | |
| 2010/0143089 A1 * | 6/2010 | Hvass | G05D 1/027 414/754 |
| 2010/0279013 A1 | 11/2010 | Frankenberger et al. | |
| 2011/0163151 A1 * | 7/2011 | Larsson | B25J 9/023 228/45 |

(Continued)

FOREIGN PATENT DOCUMENTS

| | | |
|---|---|---|
| CN | 104553342 A | 4/2015 |
| EP | 2641661 A1 | 9/2013 |

(Continued)

*Primary Examiner* — Shelby L Fidler
(74) *Attorney, Agent, or Firm* — N.V. Nederlandsch Octrooibureau; Catherine A. Shultz; Katelyn J. Bernier

(57) ABSTRACT

A system and method for printing an image on a surface using a printing robot, wherein data from an internal position determination system of the robot as well as data from a reference system comprising a stationary reference external to the robot are used to calculate an estimate of position, velocity and acceleration of the print head relative to the surface. As print head is moved along the surface during printing, i.e. as the print head is moved while ink is ejected from nozzles of the print head, the positioning of the print head and activation of nozzles of the print head are controlled based on the estimate.

8 Claims, 3 Drawing Sheets

(56) References Cited

U.S. PATENT DOCUMENTS

| | | | |
|---|---|---|---|
| 2012/0219699 A1* | 8/2012 | Pettersson | B05B 12/122 427/8 |
| 2013/0314460 A1 | 11/2013 | Orr | |
| 2014/0076985 A1 | 3/2014 | Pettersson et al. | |
| 2015/0042716 A1* | 2/2015 | Beier | B41J 11/002 347/14 |
| 2015/0186757 A1 | 7/2015 | Priyadarshi | |
| 2015/0375453 A1 | 12/2015 | Yost et al. | |
| 2016/0147153 A1 | 5/2016 | Hart et al. | |
| 2016/0176115 A1 | 6/2016 | Becker | |
| 2018/0201029 A1 | 7/2018 | Mathis | |
| 2019/0391269 A1* | 12/2019 | Bartlett | B25J 9/1676 |

FOREIGN PATENT DOCUMENTS

| | | |
|---|---|---|
| EP | 3290166 A1 | 3/2018 |
| WO | 2017106965 A1 | 6/2017 |

\* cited by examiner

HIGH ACCURACY PRINTING ON A CURVED SURFACE USING FIDUCIAL MARKERS AND A CAMERA

FIELD OF THE INVENTION

The present invention relates to a system and method for printing an image onto a curved surface using a print head that is carried by an actuated arm during movement of the print head along the curved surface, such as the outer surface of an airplane, as ink is ejected from the print head onto the curved surface.

BACKGROUND ART

From European patent EP 2799150 a system is known for applying an image on the outer surface of an airplane. The image is split up in tiles and each tile is individually printed on the surface using a graphical application device that is aligned with a fixed position relative to the surface. Each of the tiles of the image is subsequently applied with a stepwise relocation of the graphical application device with respect to the target surface. In order to carry out a coarse primary alignment of adjacent tiles, a pattern or mark is projected onto the surface using an external referring device, in particular a geodetic instrument, to provide a global referencing on the surface. Carrying out fine alignment comprises amongst other using a camera, which is mounted on the graphical application device, to capture an image of a visual feature which is a previously applied section of the image.

However, the tile wise application of the image and the necessity to carry out alignment for each tile significantly slow down printing of the image on the surface. Moreover, the known system is unsuitable to be used when it is not viable or desired to provide a fiducial mark or other kind of reference on the surface prior to printing the image on the surface.

It is an object of the invention to provide a system and method which allows accurate application of a pattern onto a target surface which at least partially overcome these drawbacks.

SUMMARY OF THE INVENTION

According to the present invention, a system for printing an image onto a three dimensional curved surface of an object is provided, the system comprising: a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising an internal position determination system comprising a plurality of sensors for determining a position and orientation of the print head relative to the base; a referencing system comprising: a stationary reference, spaced apart from the printing robot and arranged stationary with respect to the floor; and one or more fiducial markers, and a camera arranged for capturing an image of the one or more fiducial markers, wherein the one or more fiducial markers are attached to the inkjet print head and the camera is supported on the stationary reference, or wherein the one or more fiducial markers are attached to the stationary reference and the camera is attached to the inkjet print head, and wherein the referencing system is adapted for determining a position and orientation of the print head relative to the stationary reference based on the captured image of the fiducial markers; wherein the system for printing an image further comprises a controller in communication with the positioning robot, the print head, internal position system and the reference system and configured for, based on the position and orientation of the print head relative to the base determined by the print head position determination system and on the position and orientation of the print head relative to the stationary reference determined by the referencing system, calculating an estimate of the position, velocity and acceleration of the print head relative to the surface on which the image is to be printed, the controller further being adapted for controlling movement of the print head relative to the base and for controlling the print head to eject printing medium onto the surface during said movement, based on the estimate.

As the reference system is decoupled from the positioning robot, and in particular from the print head, vibrations of the print head relative to the stationary reference can be detected, based upon which a position, velocity and acceleration of the print head relative to the surface on which the image is to be printed can be estimated. The reference system is adapted for capturing images of the fiducial marks, and the controller is adapted for estimating position, velocity and acceleration of the print head at a frequency of 110 Hz or more, based on the captured images. The images of the fiducial marks are captured by the camera at at least this frequency. Typically, the internal position determination system can provide information on position and orientation of the parts of the robot, including the print head, at much higher frequencies, e.g. as frequencies of 1000 Hz or more.

Based on the estimate of position, velocity and acceleration of the print head relative to the stationary reference, any vibrations of the print head can be compensated for so that an image can be printed on the surface with high accuracy. For compensation, the controller may be adapted to adjust the jet fire timing to dynamically offset the image, and/or to mechanically stabilize the print head using high speed actuators connecting the print head to the arm.

The printing robot is typically large, i.e. the vertical distance from the base of the printing robot to the print head is typically greater than 6 m, and the arm supporting the print head will typically be at least 7 m long. For detecting large movements typically the internal position system is provided with a number of encoders for determining relative positions of parts of the printing robot relative to each other. For instance, translation and rotation of the arm relative to the base can be detected using encoders.

However, any vibrations of the printing robot or part thereof and which can propagate to the print head, are not as easily detected using encoders. Such vibrations, which may be due for instance to operation of motors that are part of the positioning robot, negatively affect the printing accuracy if not compensated for. Typically, the internal position determination system is provided with one or more inertia measurement units (IMUs) for detecting such changes in velocity and acceleration of parts of the positioning robot, which includes vibrations. IMU's can provide data on such changes at high frequencies, e.g. 1000 Hz or more. However, it was found that when the system is used to print large images, i.e. images having an area of 2 m$^2$ or more, the output such IMUs was susceptible to drift as time progresses during a continuous printing run.

The invention allows a comparison between position and orientation data provided by the internal position determination system and that provided by the reference system, so that any drift in the data from the internal position determination system can be compensated for as the print head moves relative to the surface and prints part of the image thereon. By controlling the movement of the print head relative to the base, as well as controlling when the print head ejects printing medium, such as paint of ink, on the surface during the movement, the effect of such vibrations on the image that is printed is reduced. The system of the present invention is particularly advantageous if no reference patterns, markers or the like have yet been provided on the surface on which the image is to be printed. Nonetheless, a portion of the image that is first printed on the curved surface may comprise an encoder pattern. Such an encoder pattern may then be tracked using another sensor on the print head, e.g. another camera, during printing of subsequent portions of the image.

In an embodiment the referencing system is spaced apart from the object. Thus, no personnel or machines need to approach of contact the object to attach the camera or fiducial marks to the object. Preferably, the stationary reference is arranged between the base and the surface on which the image is to be printed so that a distance between the camera and the fiducial marks is relatively small. Additionally, this arrangement provides a direct line of sight for the camera on the fiducial marks, even if the print head the robot is moved, e.g. by 3 meters or less, during printing of the image.

In an embodiment the base comprises an omnidirectional base vehicle; the printing robot further comprising a mast extending from the base vehicle; wherein the arm is supported by the mast and moveable relative to the mast; the base vehicle being adapted for moving across a floor relative to the object, wherein the arm carries the print head. The base of the robot can thus be moved to different positions around the object. During printing the base is held stationary to the floor, e.g. by placing the base vehicle in a parked position, while the print head is moved relative to the surface of the object.

In an embodiment the controller is adapted for controlling the printing robot and the print head to continuously print an area of the desired pattern, wherein said area has a width and/or height greater than that of the print head.

In an embodiment the print head is provided with a distance sensor for sensing a distance between the print head and the curved surface of the object, and wherein the controller is further configured for controlling movement of the print head relative to the surface such that the nozzles are at a distance between 0.1 and 1.2 cm from the surface at the time ink is ejected from the nozzles. FIGS. 2A and 2B of U.S. patent application Ser. No. 15/044,764 show a print head with suitable distance sensors.

In an embodiment the print head is adapted for printing with a resolution of 200 DPI (dots per inch) or more, in particular when the nozzles of the print head are within the range of between 0.1 and 1.2 cm from the surface during printing.

In an embodiment the fiducial markers comprise at least three spaced apart light emitting diodes (LEDs) which are arranged non-collinearly. Light emitted by the LEDs can easily be detected by the camera.

In a preferred embodiment the print head has a front side for facing the surface, and wherein the fiducial markers are attached to a side of the print head which faces away from the front side. The fiducial markers are light weight and thus do not significantly increase the inertia of the print head.

However, in an alternative embodiment the camera is attached to the print head. This allows the use of multiple stationary references with fiducial marks which are arranged such that while the robot moves around the object the camera always has a direct line of sight to the fiducial marks of one of these stationary references.

In an embodiment the arm is able to rotate, move translationally, and move up or down with respect to the mast.

In an embodiment the arm is provided with a wrist which allows for at least three degrees of movement relative to the arm, and wherein the print head is attached to the wrist. Preferably the wrist allows 5 of more degrees of freedom of movement relative to the arm. FIGS. 2A and 2B of U.S. patent application Ser. No. 15/044,764 show a print head with high bandwidth linear actuators suitable for use as high speed actuators in the robot of the present invention.

According to a second aspect, the invention provides a method for printing an image onto a three dimensional curved surface of an object using:

a printing robot comprising a base, an arm supported by the base and moveable relative to the base, a print head having a plurality of nozzles coupled to a source of printing medium, the arm carrying the print head, wherein the print head is adapted for ejecting printing medium based on a control signal and is moveable relative to the base in at least six degrees of freedom of movement for causing relative movement of the print head along the curved surface, the printing robot further comprising an internal position determination system comprising a plurality of sensors for determining a position and orientation of the print head relative to the base; and a referencing system comprising: a stationary reference, spaced apart from the printing robot and arranged stationary with respect to the floor; and one or more fiducial markers, and a camera arranged for capturing an image of the one or more fiducial markers, wherein the one or more fiducial markers are attached to the inkjet print head and the camera is supported on the stationary reference, or wherein the one or more fiducial markers are attached to the stationary reference and the camera is attached to the inkjet print head, wherein the referencing system is adapted for determining a position and orientation of the print head relative to the stationary reference based on the captured image of the fiducial markers;

the method comprising the steps of: arranging the stationary reference of the referencing system on the floor such that there is a line of sight between the camera and the one or more fiducial markers; and using the print head position determination system to determine the position and orientation of the print head relative to the base, using the referencing system to determine the position and orientation of the print head relative to the stationary reference, and based on these, calculating an estimate of the position, velocity and acceleration of the print head relative to the surface on which the image is to be printed, and, based on the estimate, controlling movement of the print head relative to the base and controlling the print head to eject printing medium onto the surface during said movement.

Like the system of the invention, the method the print head to be aligned relative to the surface while compensating for vibrations of the print head relative to the surface that cannot be detected accurately by the robot's internal position determination system.

In an embodiment said controlling movement of the print head relative to the base and controlling the print head to eject printing medium onto the surface during said movement comprises adjusting the jet fire timing to dynamically offset the image, and/or mechanically stabilizing the print head using high speed actuators connecting the print head to the arm.

BRIEF DESCRIPTION OF THE DRAWINGS

The present invention will be discussed in more detail below, with reference to the attached drawings, in which.

DETAILED DESCRIPTION OF THE DRAWINGS

Figure 1:
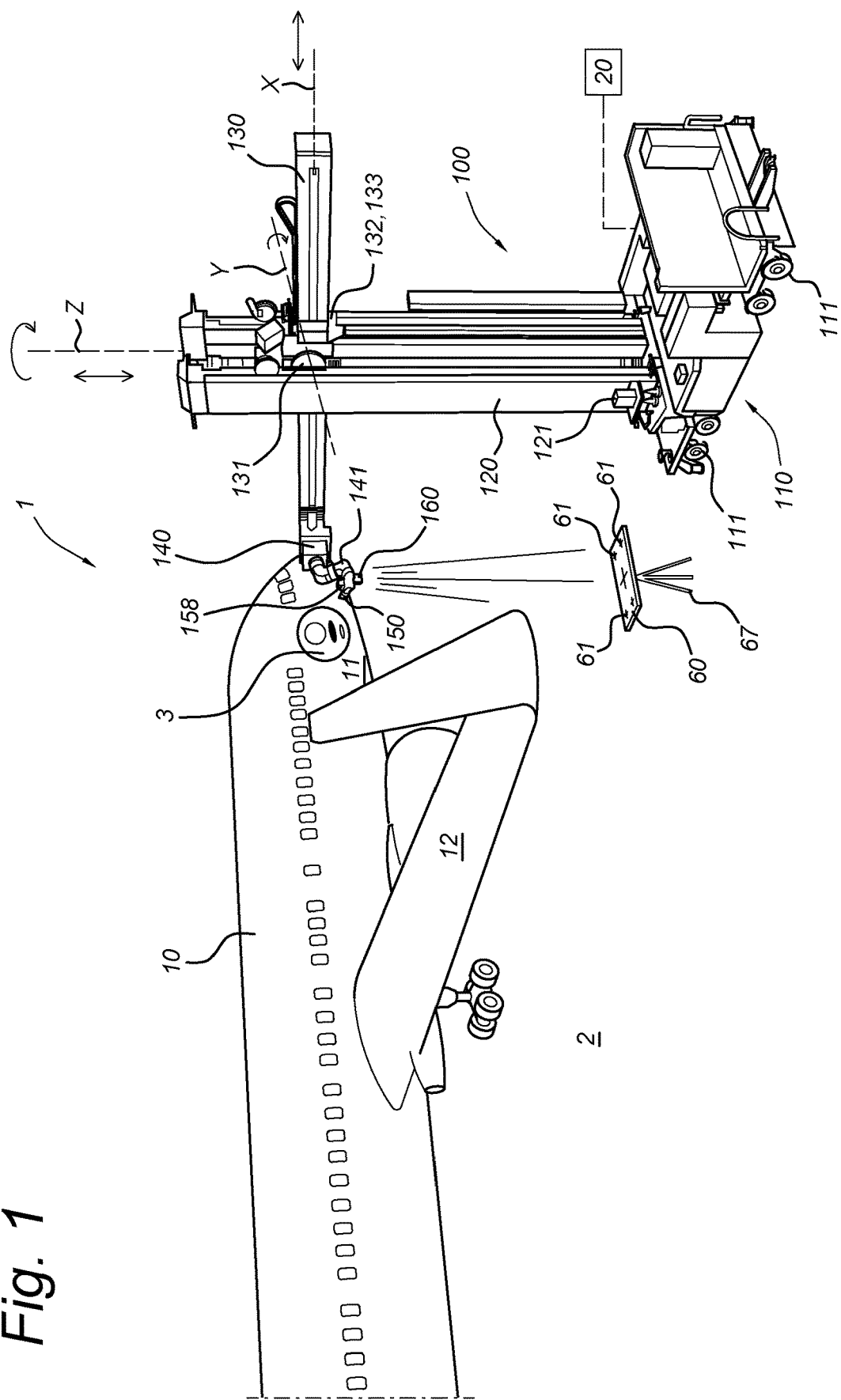
FIG. 1 schematically shows a system according to the present invention in use for applying a logo on the outer surface of an airplane.

FIGS. 1 schematically shows a perspective view of a printing system 1 according to the invention for printing an image 3 onto one or more curved 3D surfaces 11, 12 of an airplane 10. The system 1 comprises a mobile printing robot 100 comprising a base 110 which is provided with wheels 111 for driving the robot across a floor 2. The robot comprises a substantially vertically extending mast 120 which is supported on the base in 110 in such a manner that the mast can rotate relative to the base around an axis Z which extends substantially vertically from the base 110. The mast 120 in turn supports an arm 130 which can be translated relative to the mast 120 along the axis Z as well as along a longitudinal direction X of the arm. The arm can also be rotated relative to the mast 120 around a substantially horizontal axis Y which extends through the mast and perpendicular to the longitudinal direction X of the arm. At an end of the arm 130, a wrist section 140 is provided to which a print head 150 is attached. The print head is provided with a plurality of nozzles for ejecting ink on the surface 11.

The mast 120 is provided with an encoder 121 which measures a rotational position of the mast relative to the base 110 around the Z-axis. The arm 130 in turn is provided with an encoder 131 which measures a rotational position of the arm 130 relative to the mast 120 around the axis Y, and is further provided with an encoder 132 which measures a translational position of the arm 130 relative to the horizontal axis Y, and an encoder 133 which measures a translational position of the arm 130 relative to the mast along the Z-axis. The wrist 140 is provided with one or more encoders 141 for determining rotational and translational position of the print head relative to the end of the arm 130 where the wrist is attached to the arm. The encoders 121, 131, 132, 133 and 141 are all part of an internal position determination system for determining a position and orientation of the print head 150 relative to the base 110. The internal position determination system further comprises an IMU 158 which is fixed to the print head 150.

Due to the large size of the robot, and due to the limited resolution of the encoders 121, 131, 132, 133, 141, and IMU 158, the position and orientation of the print head 150 as determined by the internal position determination system may be insufficient to allow accurate printing of an image 3 on the surface 11 at a resolution of at least 200 DPI.

In order to allow more accurate determination of the position of the print head relative to the surface 11, the system 1 of the invention is further provided with a stationary reference 60 which is spaced apart from the robot 100, and the robot is provided with a camera 160 which faces away from a direction in which the nozzles can eject ink. The stationary reference 60, which is stationarily supported on the floor 2 on support legs 67, comprises a number of fiducial markers 61 which are arranged within a line of sight of the camera 160. As the print head is moved across the surface 11 while the nozzles are controlled to print ink on the surface, the camera 160 captures images of the fiducial markers 61.

Together the camera 160 and stationary reference 60 form a reference system which can be used to can detect vibrations and variations in position of the print head 150 relative to the stationary reference 60, which will substantially correspond to vibrations and variations in position of the print head 150 relative to the surface 11 on which the image is to be printed. Based on the captured images of the markers, the robot can thus be controlled to position the print head more accurately with respect to the surface 11. In particular, the reference system 60, 160 allows changes in position and orientation of the print head relative to the surface and which cannot be sensed using the internal position determination system to be taken into account.

For controlling movement of the print head and controlling ejection of ink from the nozzles of the print head, the system is further provided with a controller 20. The controller communicatively coupled with the positioning robot, the print head, internal position system and the camera 60 of the reference system. The controller thus receives first data from the internal position determination system regarding a position and orientation of the print head relative to the base as determined by the internal position determination system. Additionally, the 20 controller receives second data from camera 160 of the reference system regarding the position and orientation of the print head 150 relative to the stationary reference 60. From the first and second data the controller calculates an estimate of the position, velocity and acceleration of the print head relative to the surface on which the image is to be printed, the controller further being adapted for controlling movement of the print head relative to the base and for controlling the print head to eject printing medium onto the surface during said movement, based on the estimate.

In FIG. 1, the stationary reference 60 is arranged between the base 110 of the robot and surface 11 on which the image is to be printed, in particular between the print head and the base when seen in top view. The distance between the stationary reference and the camera thus is relatively short, allowing a more accurate estimation of the position and orientation of the print head relative to the stationary reference 60.

The image 13 that is printed on the surface 11 has a width and height greater than the width and height of the print head. In order to print the entire image, the robot is controlled to move the print head along the surface 11 in multiple passes, wherein during each pass data from the reference system together with data from the internal position determination system are used for positioning the print head relative to the surface 11.

Figure 2:
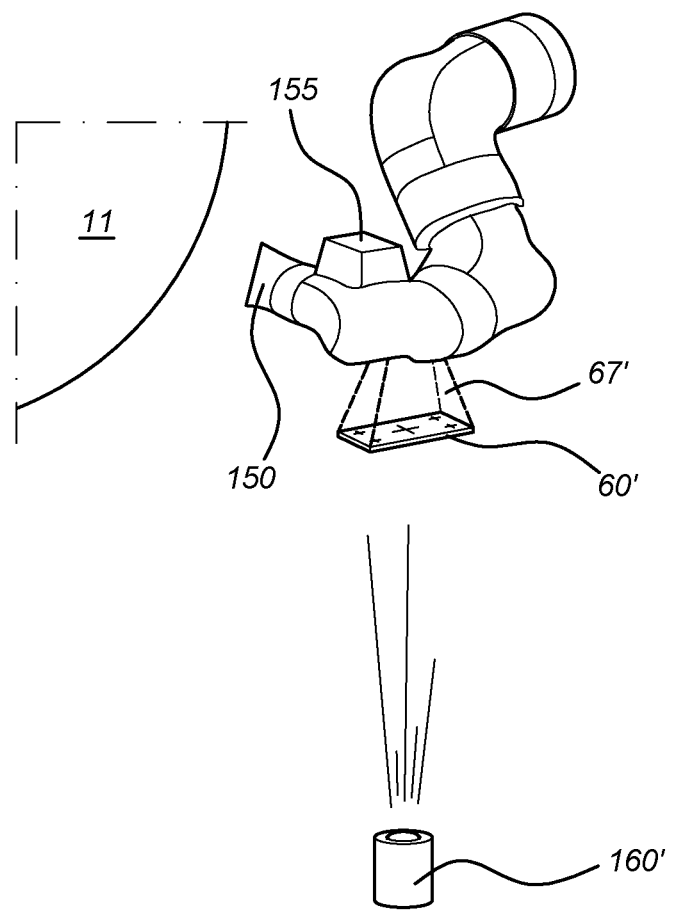
FIG. 2 schematically shows a detail of another system according to the invention.

FIG. 2 shows a detail of a system according to the invention, which is similar to the system of FIG. 1, but in which the stationary reference comprises a camera 160' which is supported stationarily on the floor, and wherein a surface 60' on which fiducial markers are provided is attached to a side of the print head facing away from the surface 11 on which the print head 150 prints the image. As the robot moves relative to the surface 11 during printing, the fiducial markers remain in a line of sight of the camera, allowing an position and orientation of the print head relative to the camera to be estimated. Based on this estimate as well as on data provided by the internal position determination system, the controller 20 controls movement of the print head and activation of the nozzles of the print head during printing. In order to more clearly show that the fiducial marks face towards the stationary camera 160' and that the camera has is a direct line of sight to the fiducial marks, a support 67' on which the surface 60' is mounted is here schematically shown to be transparent.

Figure 3:
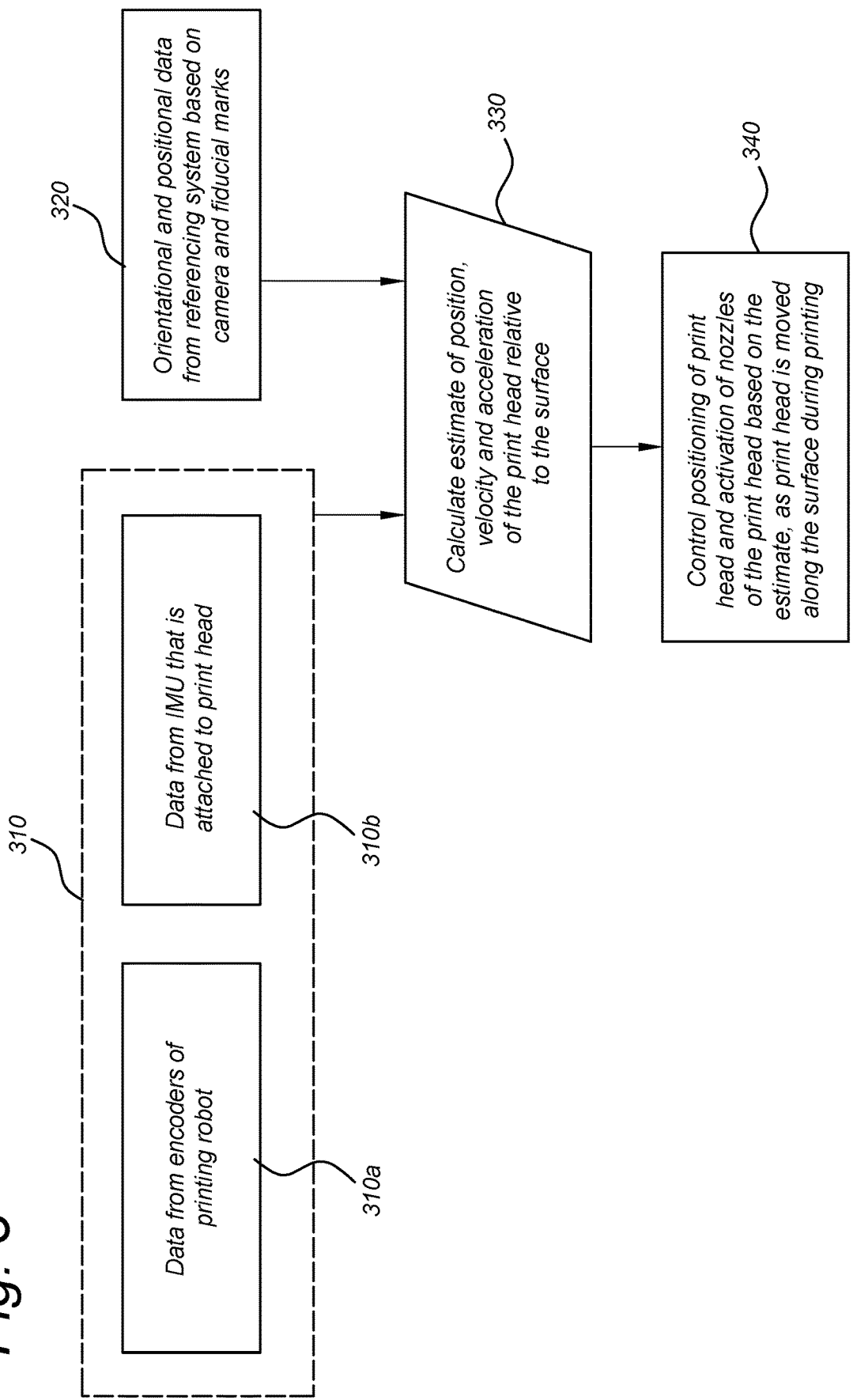
FIG. 3 shows a flow chart of the method of the present invention.

FIG. 3 schematically shows a method of the invention for use with a system according to the invention. The method comprises in parallel steps 310 and 320 sensing data respectively from the internal position determination system of the robot, and data from the referencing system. Step 310 comprises collecting data 310a from encoders of the printing robot as well as data 310b from an IMU that is attached to the print head. Step 320 comprises collecting orientational and positional data from the referencing system, based on images of the fiducial marks captured by the camera.

Based on the data collected in steps 310 and 320, in step 330 an estimate positon, velocity and acceleration of the print head relative to the surface is calculated. Due to the use of the data from the referencing system, any drift in data from the IMU can be compensated for.

Next, in step 340 the positioning the print head and activation of the nozzles of the print is controlled based on the estimate, to print a portion of the image on the surface as the print head is moved along the surface.

In summary, the invention provides a system and method for printing an image on a surface using a printing robot, wherein data from an internal position determination system of the robot as well as data from a reference system comprising a stationary reference external to the robot are used to calculate an estimate of position, velocity and acceleration of the print head relative to the surface. As print head is moved along the surface during printing, i.e. as the print head is moved while ink is ejected from nozzles of the print head, the positioning of the print head and activation of nozzles of the print head are controlled based on the estimate.

The invention claimed is:

1. A system for printing an image onto a three dimensional curved surface of an object, the comprising:
   a mobile printing robot comprising:
      an omnidirectional base vehicle comprising a base;
      a mast which extends substantially vertically and is supported on the base in such a manner that the mast can rotate relative to the base around an axis which extends substantially vertically from the base;
      an arm supported by the mast and moveable relative to the mast, wherein the arm is at least 7 m long and is able to rotate relative to the mast around a substantially horizontal axis which extends through the mast and perpendicular to a longitudinal direction of the arm, move translationally such that the entire arm translates relative to the mast along said longitudinal direction of the arm and through said substantially horizontal axis, and move up and down with respect to the mast, wherein the omnidirectional base vehicle is adapted for moving across a floor relative to the object, and wherein said axis around which the mast can rotate relative to the base intersects the arm;
      a print head having a plurality of nozzles coupled to a source of printing medium, the arm carrying the print head;
      an internal position determination system comprising a plurality of sensors for determining a position and orientation of the print head relative to the base;
   wherein the print head is adapted for ejecting printing medium based on a control signal and is moveable relative to the base in at least six degrees of freedom of movement for causing relative movement of the print head along the curved surface, wherein the print head is provided with a distance sensor for sensing a distance between the print head and the curved surface of the object during printing, and wherein the print head is adapted for printing with a resolution of 200 DPI or more when the nozzles of the print head are within the range of between 0.1 and 1.2 cm from the surface during printing;
   the printing system further comprising a referencing system comprising: a stationary reference, spaced apart from the printing robot and arranged stationary with respect to the floor; and one or more fiducial markers, and a camera arranged for capturing an image of the one or more fiducial markers, wherein the one or more fiducial markers are attached to multiple stationary references and the camera is attached to the inkjet print head, and
   wherein the referencing system is adapted for determining a position and orientation of the print head relative to the stationary reference based on the captured image of the fiducial markers;
   wherein the system for printing an image further comprises a controller in communication with the mobile printing robot, the print head, internal position determination system and the reference system and configured for, based on the position and orientation of the print head relative to the base determined by the internal position determination system, on the position and orientation of the print head relative to the stationary reference determined by the referencing system and on the distance of the print head from the curved surface of the object determined by the distance sensor, calculating an estimate of the position, velocity and acceleration of the print head relative to the surface on which the image is to be printed,
   the controller further being adapted for controlling movement of the print head relative to the base to continuously print an area of the desired pattern, wherein said area has a width and/or height greater than that of the print head, and for controlling the print head to eject printing medium onto the surface during said movement, based on the estimate, and wherein the controller is configured for controlling movement of the print head relative to the surface such that the nozzles are at a distance between 0.1 cm and 1.2 cm from the surface at the time ink is ejected from the nozzles.

2. The system according to claim 1, wherein the referencing system is spaced apart from the object, preferably wherein the multiple stationary references are arranged between the base and the surface on which the image is to be printed.

3. The system according to claim 1, wherein a portion of the image that is first printed on the curved surface comprises an encoder pattern.

4. The system according to claim 1, wherein the controller is configured for controlling movement of the print head relative to the surface such that the nozzles are at a distance between 0.3 and 1 cm from the surface at the time ink is ejected from the nozzles.

5. The system according to claim 1, wherein the fiducial markers comprise at least three spaced apart light emitting diodes which are arranged non-collinearly.

6. The system according to claim 1, wherein the print head has a front side for facing the surface.

7. The system according to claim 1, wherein the camera is attached to the print head.

8. The system of claim 1, wherein the arm is provided with a wrist which allows for at least three degrees of movement relative to the arm, and wherein the print head is attached to the wrist.

\* \* \* \* \*